US011160421B2

(12) United States Patent
Prieto et al.

(10) Patent No.: US 11,160,421 B2
(45) Date of Patent: Nov. 2, 2021

(54) HOT AIR FRYER COOKING APPLIANCE

(71) Applicant: SEB S.A., Ecully (FR)

(72) Inventors: Guillaume Prieto, Marsannay le Bois (FR); Jérémy Cornu, Lyons (FR)

(73) Assignee: SEB S.A.

(*) Notice: Subject to any disclaimer, the term of this patent is extended or adjusted under 35 U.S.C. 154(b) by 408 days.

(21) Appl. No.: 16/359,364

(22) Filed: Mar. 20, 2019

(65) Prior Publication Data

US 2019/0290072 A1    Sep. 26, 2019

(30) Foreign Application Priority Data

Mar. 21, 2018  (FR) ........................... 1852456

(51) Int. Cl.
*A47J 45/06*    (2006.01)
*A47J 37/07*    (2006.01)
*A47J 37/12*    (2006.01)

(52) U.S. Cl.
CPC .......... *A47J 45/06* (2013.01); *A47J 37/0754* (2013.01); *A47J 37/1276* (2013.01); *A47J 37/1295* (2013.01)

(58) Field of Classification Search
CPC .... A47J 45/06; A47J 37/0754; A47J 37/1295; A47J 37/1276; A47J 37/0641; A47J 45/061; A47J 37/108; A47J 45/07; A47J 37/1209; A47J 37/12; A47J 27/04; A47J 36/16; A47J 2027/043
USPC .................................. 99/331, 337, 403–418
See application file for complete search history.

(56) References Cited

U.S. PATENT DOCUMENTS

| | | | |
|---|---|---|---|
| 2,868,112 A | 1/1959 | Bushway | |
| 2017/0231430 A1* | 8/2017 | Moon | A47J 37/1266 99/331 |
| 2018/0035698 A1* | 2/2018 | McNerney | A47J 37/0641 |

FOREIGN PATENT DOCUMENTS

| | | |
|---|---|---|
| DE | 20 2017 103259 U | 6/2017 |
| EP | 1 426 001 A1 | 6/2004 |
| EP | 1 428 464 A1 | 6/2004 |
| WO | WO 2007/145516 A2 | 12/2007 |

OTHER PUBLICATIONS

Search Report as issued in French Patent Application No. 1852456, dated Nov. 12, 2018.

* cited by examiner

*Primary Examiner* — Phuong T Nguyen
(74) *Attorney, Agent, or Firm* — Lerner, David, Littenberg, Krumholz & Mentlik, LLP

(57) ABSTRACT

A hot air fryer cooking appliance includes a hot air blowing system, a vessel and a basket. The basket includes a manipulating handle having a bracket and the vessel including an upper edge and a receiving area for the handle. The bracket bears against the upper edge and the handle is housed in the receiving area when positioning the basket in the vessel. The basket includes on its outer and inner walls a first and a second assembly part, respectively. These assembly parts cooperate and ensure the lateral guiding of the basket when positioning the basket in the vessel until the handle reaches its position in its receiving area and the basket reaches a centered bearing position in the vessel, allowing the bottom of the basket to be kept away from the bottom of the vessel and to be laterally wedged in the vessel.

12 Claims, 3 Drawing Sheets

HOT AIR FRYER COOKING APPLIANCE

CROSS REFERENCE TO RELATED APPLICATIONS

This application claims priority to French Patent Application No. 1852456, filed Mar. 21, 2018, the entire content of which is incorporated herein by reference in its entirety.

FIELD

This invention concerns a hot air fryer cooking appliance and concerns particularly the support system for a basket in a vessel of the hot air fryer.

BACKGROUND

Hot air fryer cooking appliances are known to persons skilled in the art. Such appliances significantly reduce, or even completely eliminate, the quantity of fat used to cook foods of plant or animal origin, such as French fries or fish. In fact, the cooking takes place with little or no oil because of the hot air circulating in a vessel, making it possible to eat healthier foods that are crisp on the outside and soft on the inside. Since cooking oil is reduced or eliminated, these appliances release fewer odors and fat; in addition, they are easier to clean.

A hot air fryer cooking appliance generally comprises a removable vessel configured to receive a basket in which the foods to be cooked are arranged. Once the basket is placed in the vessel, the whole is inserted into a chamber into which hot air is forced by means of a hot air blowing system incorporated in the appliance. The forced hot air circulates in the chamber and in the vessel containing the basket with the foods, thus cooking them.

To ensure the foods are cooked uniformly, the bottom of the basket must be kept away from the bottom of the vessel and there must be adequate hot air circulation in the vessel.

The German utility model published under the number DE202017103259U describes a hot air fryer in which the bottom of the vessel has some raised shapes and the basket comprises, on its upper front portion, a manipulating handle equipped with a first bracket which bears against the upper edge of the vessel and, on its lower back portion, two second brackets bearing intermittently against two raised parts projecting from the bottom of the vessel. Although this implementation favors uniform distribution of the hot air in the vessel and around the basket and ensures stability of the basket placed in the vessel, it has several disadvantages. In fact, when the basket is placed in the vessel, the user must be sure to engage the manipulating handle of the basket on the edge of the vessel, while properly positioning the second brackets bearing against the raised parts on the bottom of the vessel; the clearances in the engaging area of the manipulating handle on the vessel may cause incorrect positioning of the two second brackets on the two raised parts on the bottom of the vessel. In addition, the friction of the second brackets on the bottom of the vessel may damage the bottom.

SUMMARY

An aspect of the invention implements a hot air fryer cooking appliance which allows uniform distribution of hot air in the vessel in order to appropriately cook all foods arranged in the basket, while ensuring precise, intuitive and stable positioning of the basket in the vessel, without risk of damaging the bottom of the vessel.

For this purpose, an embodiment of the invention concerns a hot air fryer cooking appliance comprising a hot air blowing system, a vessel and a basket. The cooking appliance also has other characteristics that are traditionally found on such an appliance, namely a chamber for receiving the vessel with the basket housed in the latter. The hot air blowing system makes it possible to force hot air into the chamber and the vessel.

According to an embodiment of the invention, the basket comprises a front side on which is arranged a manipulating handle equipped with a bracket, and the vessel comprises an upper edge and a front side on which is arranged a receiving area for the manipulating handle. The bracket bears against the upper edge and the manipulating handle is housed in the receiving area when positioning the basket in the vessel.

The front side is defined by the position of the manipulating handle, arranged in the facade of the cooking appliance once the vessel and the basket are inserted into the chamber of the appliance, insertion taking place from front to back through action on the manipulating handle, and removal taking place inversely.

Remarkably, according to an embodiment of the invention, the basket comprises an outer wall equipped with at least one first assembly part, and the vessel comprises an inner wall equipped with at least one second assembly part. The at least one first assembly part and the at least one second assembly part are configured to cooperate and ensure the lateral guiding of the basket when positioning the basket in the vessel until the handle reaches its position in its receiving area and the basket reaches a centered bearing position in the vessel, allowing the bottom of the basket to be kept away from the bottom of the vessel and allowing the basket to be laterally wedged in the vessel so as to position the basket in a functional cooking position.

According to a first design of the cooking appliance, a single first assembly part and a single second assembly part are implemented. The basket comprises a rear side equipped on its outer face with a first assembly part, and the vessel comprises a rear side equipped on its inner face with a second assembly part. The first assembly part and the second assembly part are configured to cooperate and ensure the lateral guiding of the basket during its placement in the vessel until the basket reaches a centered bearing position in the vessel, allowing the bottom of the basket to be kept away from the bottom of the vessel and allowing the basket to be laterally wedged in the vessel.

According to a second design of the cooking appliance, two first assembly parts and two second assembly parts are implemented. The basket comprises two lateral sides, each equipped on their outer faces with a first assembly part, and the vessel comprises two lateral sides, each equipped on their inner faces with a second assembly part. The two first assembly parts and the two second assembly parts are configured to cooperate and ensure the lateral guiding of the basket during its placement in the vessel until the basket reaches a centered bearing position in the vessel, allowing the bottom of the basket to be kept away from the bottom of the vessel and allowing the basket to be laterally wedged in the vessel.

Other design variants of the cooking appliance could be envisioned, with a variable number of first assembly parts and second assembly parts, whose positions will depend, for example, on the shape of the outer wall of the basket and the shape of the inner wall of the vessel.

The guiding and centering ensure an intuitive placement of the basket in the vessel until reaching a bearing position where the basket is wedged in the vessel, during the positioning of the manipulating handle in the receiving area. This wedging makes it possible to maintain a constant separation between the basket and the vessel, on their entire perimeter, which ensures a uniform flow of hot air on the entire contour of the basket. The positions of the at least one first assembly part and of the at least one second assembly part, respectively on the outer and inner walls, ensure that the basket is kept in the vessel without having to bear on the bottom of the vessel, thus preventing any scratching on the latter during manipulation of the basket.

According to an embodiment of the cooking appliance, each first assembly part comprises two guide branches extending upward while drawing closer to each other until forming a peak. In addition, each second assembly part comprises a protruding element which is housed between the two branches when positioning the basket in the vessel. In other words, the two branches roughly form an inverted V, the flared portion of the V facilitating the introduction of the protruding element between the two branches; then the narrowing of the inverted V allows the branches to guide the basket with respect to the protruding element in order to center the basket in the vessel, until reaching the tip of the inverted V where the branches are wedged and bear against the protruding element.

A design that is the reverse of the aforementioned preferred embodiment could be envisioned. In fact, the first assembly part on the basket may comprise the protruding element and the second assembly part on the vessel may comprise the two branches which, in this case, extend downward—and not upward—while drawing closer to each other until forming a small pit, the protruding element being housed between the two branches until abutting the small pit, when positioning the basket in the vessel.

According to this embodiment and for an implementation of the cooking appliance according to the aforementioned first design, the lower extremities of the guide branches are extended toward the front of the appliance, that is, in the direction of the manipulating handle, by two deflectors arranged at right angles with respect to the branches, the deflectors extending below the bottom of the basket. These deflectors make it possible to direct the hot air circulation in the vessel during cooking. Thus, the hot air circulates in a controlled manner in the vessel and the basket, for optimum cooking of the foods. These two deflectors form a tip oriented toward the front of the vessel. In an embodiment, the branches and the deflectors are formed of a single piece. In an embodiment, the branches and the deflectors are made of plastic material. The deflectors are configured to remain away from the bottom of the vessel when the basket is housed in the vessel, that is, when the peak between the two branches is wedged on the protruding element, in order to avoid any risk of scratching on the bottom of the vessel.

According to this embodiment of the cooking appliance implemented according to the first design or according to the second design, or even according to any other design variant, each protruding element is formed of a boss on the inner wall of the vessel. As a variant, each protruding element may be formed of a part connected to the inner wall of the vessel.

According to the cooking appliance according to an embodiment of the invention, a locking system is arranged between the manipulating handle and the receiving area, in order to keep the basket and the vessel assembled. This locking system can be deactivated by a control button in order to separate the basket from the vessel. These characteristics are already known on fryer cooking appliances.

BRIEF DESCRIPTION OF THE FIGURES

The following description of a non-restrictive embodiment of the hot air fryer cooking appliance highlights the characteristics and benefits of this invention. This description is supported by figures, among which.

DETAILED DESCRIPTION

FIGS. 1 to 6 do not illustrate the entire hot air fryer cooking appliance, but only the characteristics according to an embodiment of the invention which deal with the vessel and the basket. The other characteristics (hot air blowing system, chamber in which the vessel and the basket are inserted, etc.) of such an appliance are already known, and therefore they are not described below. The person skilled in the art may refer to the hot air fryers already on the market.

Figure 1:
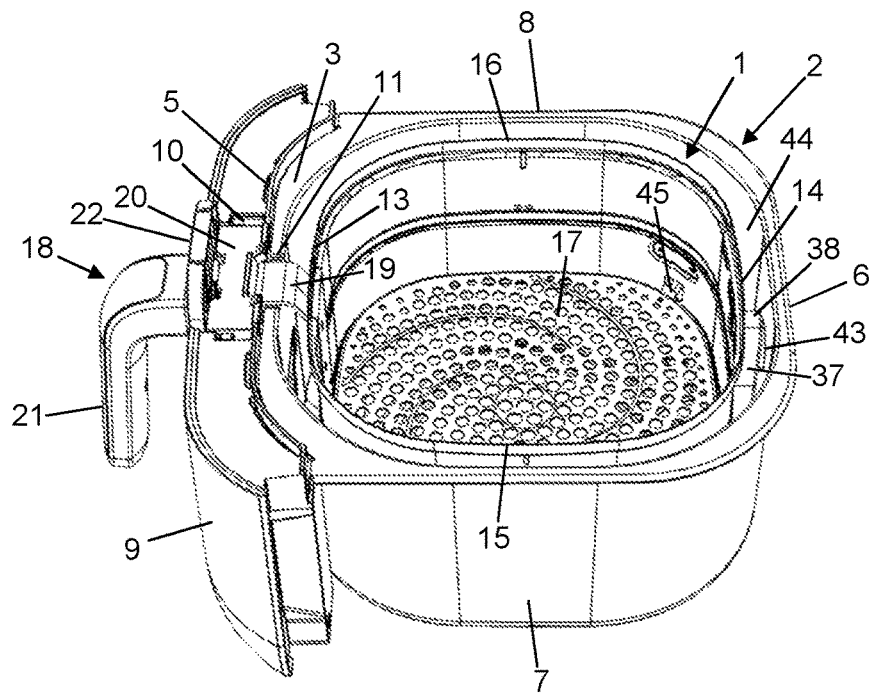
FIG. 1 illustrates a basket housed in a vessel, the basket and the vessel being assembled together.
Figure 2:
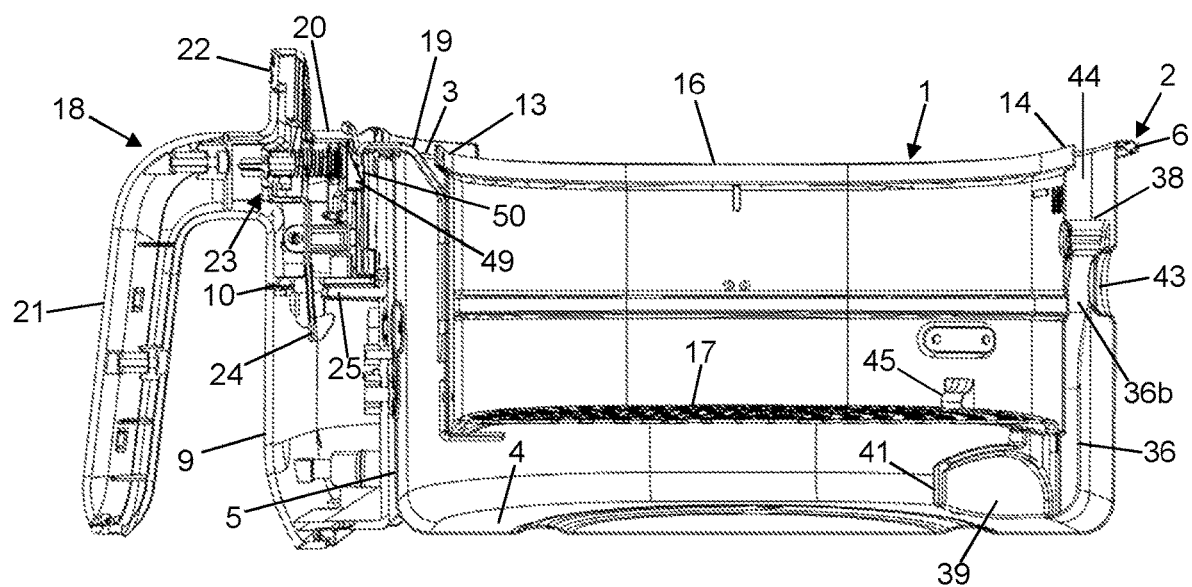
FIG. 2 shows a cross-section side view of FIG. 1.
Figure 3:
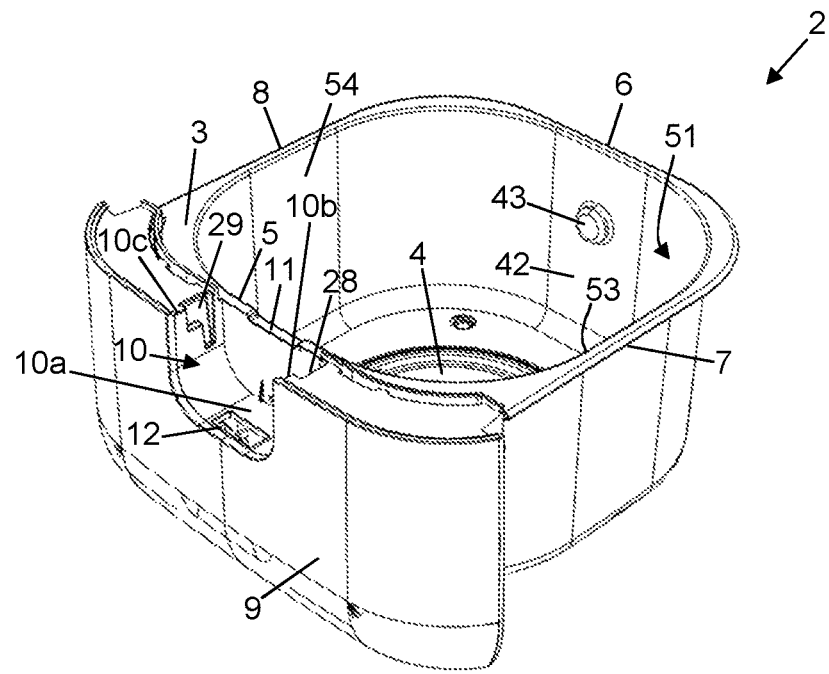
FIG. 3 shows in perspective, from above, the vessel alone.

FIGS. 1 and 2 show a basket 1 placed inside a vessel 2 and assembled with the latter. As illustrated by FIGS. 1 to 3, the vessel 2 comprises an upper edge 3, a bottom 4, a front side 5, a rear side 6, two lateral sides 7, 8 and a facade 9 which is arranged on the front side 5. A receiving area 10 is provided on the facade 9. The upper edge 3 comprises a small notch 11 arranged opposite the receiving area 10. The receiving area 10 comprises in its lower portion 10a an opening 12. As illustrated by FIGS. 1, 2, 4 and 5, the basket 1 comprises a front side 13, a rear side 14, two lateral sides 15, 16, a bottom 17 and a manipulating handle 18 which is fixed to the front side 13 by means of a bracket 19 having a curved shape. The manipulating handle 18 comprises a body 20 with dimensions adapted to the receiving area 10 and a shaft 21 for gripping. A control button 22 is arranged in the upper portion of the shaft 21 to actuate a transmission mechanism 23 acting on a latch 24 for unlocking the basket 1 from the vessel 2. When the basket 1 is placed in the vessel 2, the bracket 19 is positioned in the small notch 11, the body 20 is positioned in the receiving area 10 and the latch 24 penetrates the opening 12 and snaps under the rear edge 25 of this opening 12, ensuring that the basket 1 locks onto the vessel 2. The actuation of the button 22 makes it possible to release the latch 24 from the rear edge 25 of the opening 12, to unlock the basket 1 and extract it from the vessel 2. Two fingers 26, 27 are arranged on the lateral sides 20a, 20b of the body 20 and are positioned in guide notches 28, 29 arranged on the lateral sides 10b, 10c of the receiving area 10; when the fingers 26, 27 are housed in the notches 28, 29, the basket 1 is wedged in translation from front to back with respect to the vessel 2 and the front side 13 of the basket 1 is laterally wedged in translation with respect to the front side 5 of the vessel 2.

Thus, the transmission mechanism 23, the latch 24 and the rear edge 25 form a locking system arranged between the manipulating handle 18 and the receiving area 10 so as to keep the basket 1 and the vessel 2 assembled in a functional cooking position, the locking system being able to be deactivated by a control button 22 so as to separate the basket from the vessel.

Figure 4:
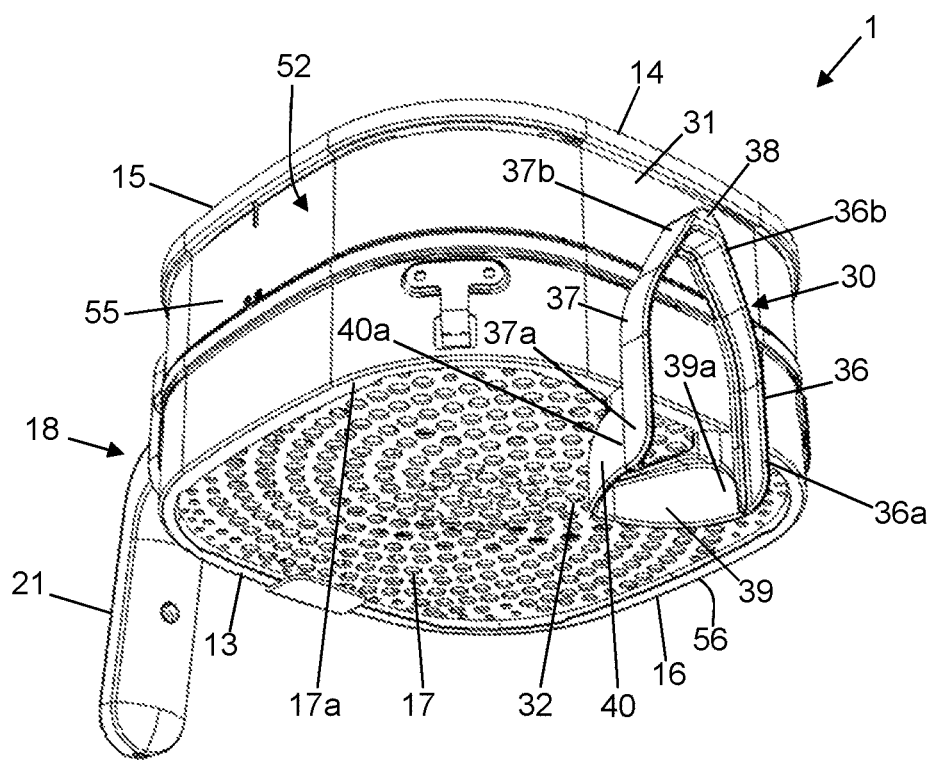
FIGS. 4 and 5 show in perspective the basket alone, according to two different viewing angles, the bottom of the basket not being illustrated in FIG. 5.
Figure 5:
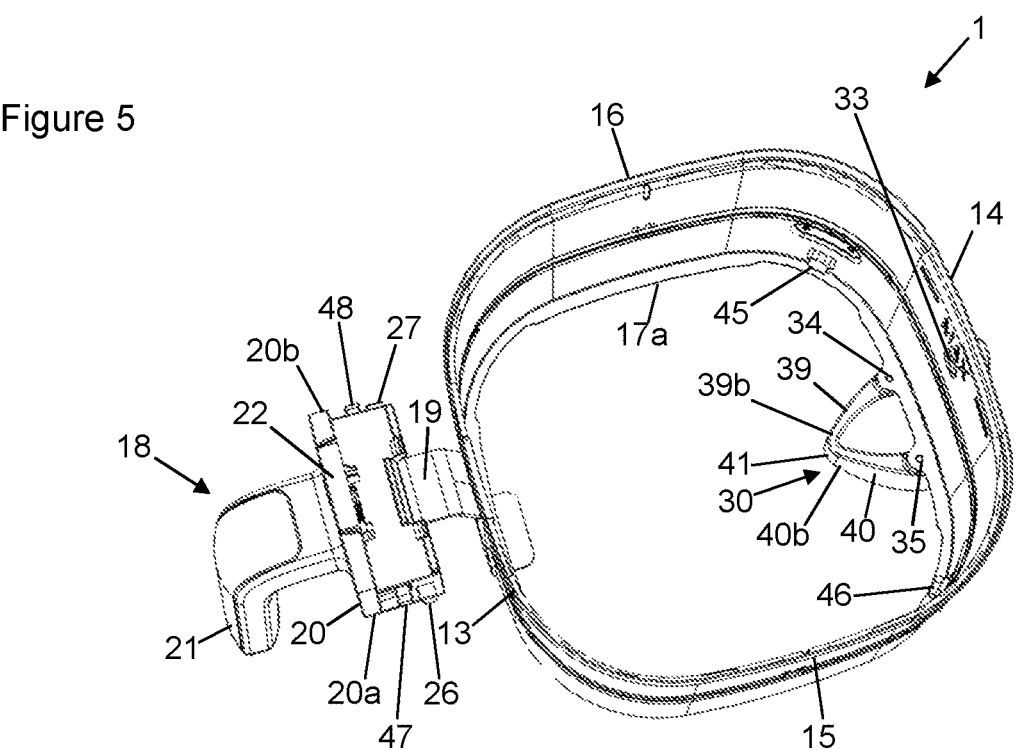
Figure 6:
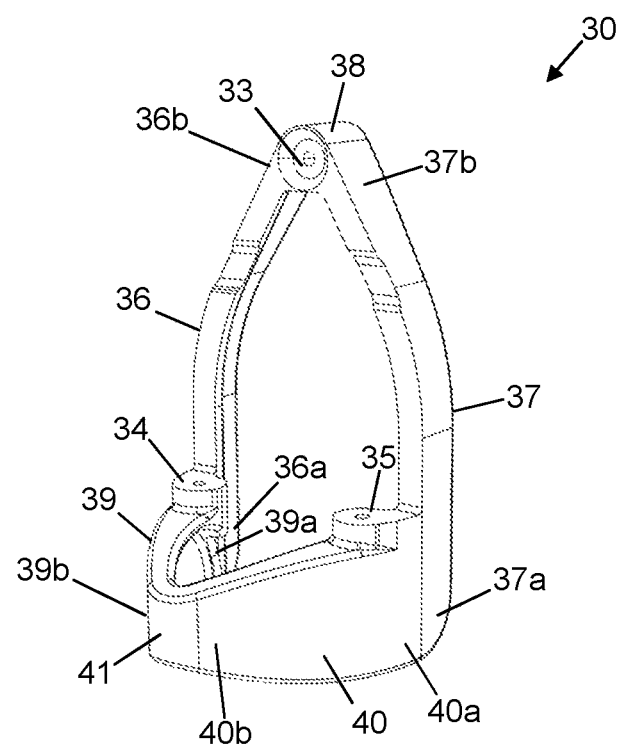
FIG. 6 shows in perspective an embodiment, in a single piece, of the first assembly part and the deflectors.

As illustrated by FIGS. 4 to 6, the basket 1 comprises a first assembly part 30 which is made of plastic material, for example, a polyphenylene sulfide (PPS). This part 30 is connected on an outer face 31 of the rear side 14 and on an inner face 32 of the bottom 17 by means of three assembly points 33, 34, 35, the assembly being carried out by screwing on the contour 17a of the bottom and on the rear side 14. The part 30 comprises two guide branches 36, 37 whose lower extremities 36a, 37a are flared and whose upper extremities 36b, 37b join in a peak 38. The two branches 36, 37 are arranged against the outer face 31 of the rear side 14. The part 30 also comprises two deflectors 39, 40 which are arranged at right angles with respect to the branches 36, 37 and below the lower face 32 of the bottom 17. The rear extremities 39a, 40a of the deflectors 39, 40 extend the lower extremities 36a, 37a of the branches 36, 37 and the front extremities 39b, 40b of the deflectors 39, 40 join to form a tip 41. The branches 36, 37 are arranged symmetrically in relation to the median plane of the basket 1, the tip 38 being situated in this median plane. Likewise, the deflectors 39, 40 are arranged symmetrically in relation to the median plane of the basket 1.

As illustrated by FIG. 3, the inner face 42 of the rear side 6 of the vessel 2 comprises a second assembly part having a protruding element 43 which is implemented by forming a boss on the rear side 6. However, a stud (not illustrated) could be connected by screwing on this inner face 42 in order to implement the protruding element 43. The protruding element 43 is arranged in the median plane of the vessel 2.

As illustrated by FIGS. 1 and 2, when the basket 1 is placed in the vessel 2, the lower extremities 36a, 37a of the branches 36, 37 are positioned one on each side of the protruding element 43, the flared shape of the branches 36, 37 facilitating the introduction of the protruding element 43 between the lower extremities 36a, 37a. When the basket 1 is lowered into the vessel 2, the narrowing of the distance between the branches 36, 37 makes it possible to center the peak 38 with respect to the protruding element 43, until the peak 38 abuts the protruding element 43. In this stop position illustrated on FIGS. 1 and 2, the bottom 17 of the basket 1 is away from the bottom 4 of the vessel 2 and positioned in a functional cooking position. Likewise, the deflectors 39, 40 are not in contact with the bottom 4 of the vessel 2. In addition, the protruding element 43 is wedged between the upper extremities 36b, 37b of the branches 36, 37, which blocks the lateral translation of the rear side 14 of the basket 1 with respect to the rear side 6 of the vessel 2. As described previously, once the body 20 of the manipulating handle 18 is inserted in the receiving area, the fingers 26, 27 of the body 20 are wedged from front to back in the notches 28, 29 on the receiving area, which blocks any translation from front to back (and inversely) between the basket 1 and the vessel 2 and, thus, ensures that the peak 38 is kept abutting against the protruding element 43. In other words, the protruding element 43 cannot be released from the two branches 36, 37. The wedging in lateral translation of the front side 13 and rear side 14 of the basket 1 with respect to the front side 5 and rear side 6 of the vessel 2, and the wedging in translation from front to back (and inversely) of the basket 1 with respect to the vessel 2 make it possible to keep the basket 1 centered with respect to the vessel 2 and, in this way, to maintain a constant space 44 between the periphery of the basket 1 and the periphery of the vessel 2.

Thus, the precise placement of the basket 1 in the vessel 2 is carried out intuitively due to the branches 36, 37 and the protruding element 43 which guide the insertion of the basket 1 into the vessel 2. The constant space 44 between the periphery of the basket 1 and the periphery of the vessel 2 ensures a uniform distribution of hot air in the vessel 2, around the basket 1. Keeping the bottom 17 of the basket 1 away from the bottom 4 of the vessel 2 also ensures uniform circulation of hot air below the basket 1. The presence of the deflectors 39, 40 below the basket 1 makes it possible to direct the flow of hot air and make it circulate appropriately in the vessel 2 and the basket 1.

Other characteristics may be envisioned without departing from the context of the invention.

As illustrated by FIGS. 1, 2, 4 and 5, the bottom 17 of the basket 1 is removable to facilitate its cleaning, or even to change the bottom 17 according to the type of foods to be cooked. For this purpose, the bottom 17 rests on the contour 17a and is kept in position with elastic strips 45, 46.

The manipulating handle 18 is removable from the basket 1 to facilitate cleaning of the basket 1. For this purpose, as illustrated in FIGS. 2 and 5, the body 20 of the manipulating handle 18 comprises on its lateral sides 20a, 20b two triggers 47, 48 which can be actuated to move a bolt 49 on the body 20 and take it out of a striker 50 arranged on the bracket 19, so as to unlock the bracket 19 with respect to the body 20 and to allow the manipulating handle 18 to travel downward with respect to the bracket 19.

Design variants of the invention may be envisioned.

For example, one could arrange on the outer face 31 of the rear side 14 of the basket 1 a protruding element similar to the protruding element 43, and arrange on the inner face 42 of the rear side 6 of the vessel 2 two branches of similar design to the branches 36, 37, but with the direction reversed such that the peak 38 is at the bottom and forms a small pit in which the protruding element of the basket 1 will be housed when it is placed in the vessel 2. In this case, the deflectors 39, 40 will be implemented by means of an independent part, in a position similar to the one illustrated in FIG. 4.

One could also provide several protruding elements similar to the protruding element 43 and arranged on the inner wall 51 of the vessel 2 and provide as many branches similar to the two branches 36, 37 and arranged on the outer wall 52 of the basket 1 corresponding to the protruding elements. For example, two protruding elements are arranged on the inner faces 53, 54 of the lateral sides 7, 8 of the vessel 2 and two sets of two branches are arranged on the outer faces 55, 56 of the lateral sides 15, 16 of the basket 1. In this case, the deflectors 39, 40 will be implemented by means of an independent part, in a position similar to the one illustrated in FIG. 4. The positions of the protruding elements and of the branches on the inner wall 51 and outer wall 52 could also be reversed, as explained above.

The invention claimed is:

1. A hot air fryer cooking appliance comprising a hot air blowing system, a vessel and a basket, the basket comprising a front side on which is arranged a manipulating handle equipped with a bracket and the vessel comprising an upper edge and a front side on which is arranged a receiving area for the manipulating handle, the bracket bearing against the upper edge and the manipulating handle being housed in the receiving area when positioning the basket in the vessel, wherein the basket comprises an outer wall equipped with at least one first assembly part and the vessel comprises an inner wall equipped with at least one second assembly part, the at least one first assembly part and the at least one second assembly part being configured to cooperate and ensure lateral guiding of the basket when positioning the basket in the vessel until the manipulating handle reaches its position in its receiving area and the basket reaches a centered bearing position in the vessel, allowing the bottom of the basket to be kept away from the bottom of the vessel and allowing the basket to be laterally wedged in the vessel so as to position the basket in a functional cooking position.

2. The hot air fryer cooking appliance according to claim 1, wherein the basket comprises a rear side equipped on its outer face with a first assembly part and the vessel comprises a rear side equipped on its inner face with a second assembly part, the first assembly part and the second assembly part being configured to cooperate and ensure the lateral guiding of the basket when placing the basket in the vessel until the basket reaches a centered bearing position in the vessel, allowing the bottom of the basket to be kept away from the bottom of the vessel and allowing the basket to be laterally wedged in the vessel.

3. The hot air fryer cooking appliance according to claim 2, wherein each first assembly part comprises two guide branches extending upward while drawing closer to each other until forming a peak and each second assembly part comprises a protruding element which is housed between the two branches when positioning the basket in the vessel.

4. The hot air fryer cooking appliance according to claim 3, wherein the lower extremities of the guide branches are extended toward the front of the appliance by two deflectors arranged at right angles with respect to the branches and extending below the bottom of the basket, the deflectors making it possible to direct the circulation of hot air in the vessel.

5. The hot air fryer cooking appliance according to claim 4, wherein the two deflectors form a tip oriented toward the front of the vessel.

6. The hot air fryer cooking appliance according to claim 4, wherein the branches and the deflectors are formed of a single piece.

7. The hot air fryer cooking appliance according to claim 4, wherein the branches and the deflectors are made of plastic material.

8. The hot air fryer cooking appliance according to claim 4, wherein the deflectors are configured to stay away from the bottom of the vessel when the basket is housed in the vessel.

9. The hot air fryer cooking appliance according to claim 3, wherein each protruding element is formed of a boss on the inner wall of the vessel.

10. The hot air fryer cooking appliance according to claim 3, wherein each protruding element is formed of a part connected on the inner wall of the vessel.

11. The hot air fryer cooking appliance according to claim 1, wherein the basket comprises two lateral sides each equipped on their outer faces with a first assembly part, and the vessel comprises two lateral sides each equipped on their inner faces with a second assembly part, the two first assembly parts and the two second assembly parts being configured to cooperate and ensure the lateral guiding of the basket when placing the basket in the vessel until the basket reaches a centered bearing position in the vessel, allowing the bottom of the basket to be kept away from the bottom of the vessel and allowing the basket to be laterally wedged in the vessel.

12. The hot air fryer cooking appliance according to claim 1, further comprising a locking system arranged between the manipulating handle and the receiving area so as to keep the basket and the vessel assembled, the locking system being able to be deactivated by a control button so as to separate the basket from the vessel.

* * * * *